United States Patent [19]

Tamanini

[11] 4,086,026
[45] Apr. 25, 1978

[54] WINDMILL WITH RADIAL VANES

[76] Inventor: Robert J. Tamanini, 4 Pinewood Rd., Wyomissing, Pa. 19610

[21] Appl. No.: 766,055

[22] Filed: Feb. 4, 1977

[51] Int. Cl.² ............................................. F03D 1/06
[52] U.S. Cl. .................................... 416/176; 416/9; 416/193 R
[58] Field of Search ............... 416/193, 176, 177, 189, 416/9, 181, DIG. 3, 175

[56] References Cited

U.S. PATENT DOCUMENTS

| 4,963 | 2/1847 | Armstrong et al. | 416/189 |
| 657,611 | 9/1900 | Northcutt | 416/181 |
| 1,116,177 | 11/1914 | Wakefield | 416/181 |
| 2,980,990 | 4/1961 | Sprouse | 416/DIG. 3 |
| 3,071,194 | 1/1963 | Geske | 416/175 X |
| 3,924,966 | 12/1975 | Tamanini | 416/177 |

FOREIGN PATENT DOCUMENTS

| 773,198 | 11/1934 | France | 416/177 |
| 45,065 | 5/1935 | France | 416/193 |
| 1,020,606 | 12/1957 | Germany | 416/193 |
| 150,064 | 12/1966 | U.S.S.R. | 416/181 |

*Primary Examiner*—Everette A. Powell, Jr.
*Attorney, Agent, or Firm*—Clarence A. O'Brien; Harvey B. Jacobson

[57] ABSTRACT

An elongated cylindrical body is provided of a greater length than its diameter and including a cylindrical side wall. The body is open at its opposite ends and journaled for rotation about an axis generally coinciding with the center axis of the body. The body includes a plurality of circumferentially spaced longitudinally extending slots similarly slightly inclined relative to radial planes of the body passing through the slots. One set of corresponding edge portions of the cylindrical side wall defining corresponding longitudinal edges of the slots include integral outwardly projecting substantially rectangular vanes extending along the slots and the vanes comprise outwardly deflected integral positions of the cylindrical side wall of the body. Further, in a modified form of the invention, the other set of corresponding longitudinal edges of the slots include inwardly projecting substantially rectangular vanes extending along the slots.

2 Claims, 4 Drawing Figures

WINDMILL WITH RADIAL VANES

BACKGROUND OF THE INVENTION

There have been various forms of wind-driven rotors heretofore designed. Some of these wind rotors are constructed for optimum performance within a narrow band wind velocities and are expensive to manufacture, while other forms of wind rotors are constructed to operate throughout wider bands of wind velocities. The latter forms are more desirable in that they are capable of generating power from the wind, but some are constructed so as to be relatively inefficient. The power generator in my prior U.S. Pat. No. 3,924,966 constitutes a wind rotor which is capable of operating throughout a reasonably wide band of wind velocities, but is limited to the total vane area thereof which may be included on a wind rotor of cylindrical configuration. Accordingly, a need exists for a wind rotor which is operable throughout a wide band of wind velocities and yet which will present considerable vane area to the wind for action thereon by the latter and which will thus be efficient in operation.

BRIEF DESCRIPTION OF THE INVENTION

The windmill of the instant invention is generally cylindrical in configuration and includes circumferentially spaced longitudinally extending slots similarly inclined relative to radial planes passing through the slots. Corresponding edge portions of the slots included inwardly projecting vanes extending therealong and the opposite ends of the cylindrical windmill are open for the passage of air therethrough. The vanes project outwardly from the outer periphery of the windmill and thus are arranged in a large diameter annular area as opposed to the smaller diameter annular area which would be swept thereby if the vanes were radially inwardly directed as opposed to outwardly radially directed. The windmill is journaled for rotation about an axis extending in the direction of movement of an associated vehicle from which the rotor is journaled, or the wind rotor may be mounted on a stationary support by means of a turntable structure and equipped with a wind vane whereby one end of the windmill will face into the wind at all times. The windmill includes a central shaft from which rotation of torque developed by the windmill may be realized and harnessed in any convenient manner.

The main object of this invention is to provide a windmill constructed in a manner so as to be efficient through a wide band of wind velocities.

Another object of this invention, in accordance with the immediately preceding object, is to provide a windmill of simple construction and which may be produced at a low cost.

Yet another object of this invention is to provide a windmill whose structural features render it adaptable for use on a vehicle as well as for use on a stationary object subject to surface winds.

A further object of this invention is to provide a windmill which will be capable of presenting relatively large vane cross-sectional areas to the relative wind.

A final object of this invention to be specifically enumerated herein is to provide a windmill in accordance with the preceding objects and which will conform to conventional forms of manufacture, be of simple construction and efficient in operation so as to provide a device that will be economically feasible, long lasting and capable of generating considerable torsional forces.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
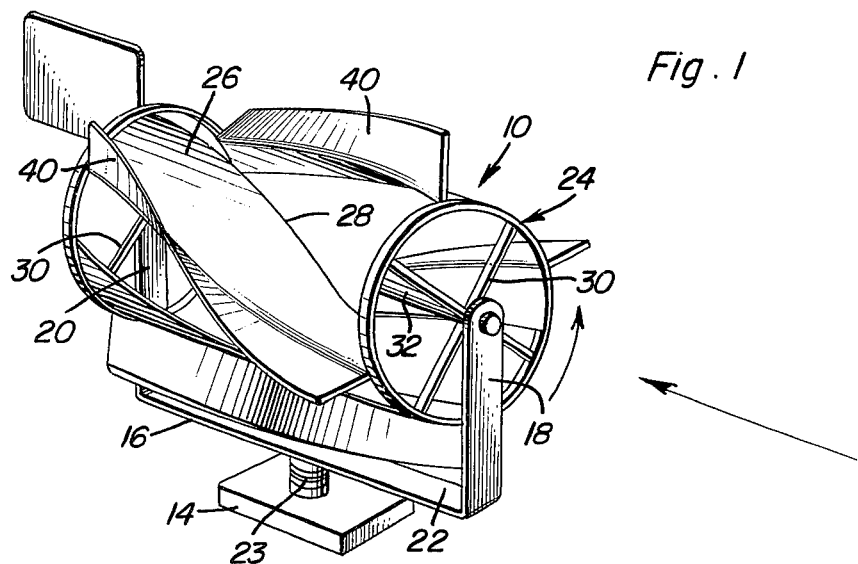
FIG. 1 is a perspective view of the windmill of the instant invention journaled from a mount supported for oscillation about an axis disposed generally normal to the axis of rotation of the windmill and with the mount provided with a wind vane.

Referring now more specifically to the drawings, the numeral 10 generally designates the windmill of the instant invention. The windmill 10 includes a stationary base 14 from which a bifurcated mount 16 is supported for oscillation about a vertical axis. The mount 16 includes a pair of front and rear upstanding support arms 18 and 20 interconnected at their lower ends by means of a horizontal bight portion 22 and the bight portion 22 is oscillatably supported from the base 14 by means of a bearing assembly 23.

The windmill 10 further includes a rotor referred to in general by the reference numeral 24 and the rotor 24 includes a body having a generally cylindrical side wall 26 open at its opposite ends. The cylindrical side wall 26 includes a plurality of circumferentially spaced and longitudinally extending slots 28 which are similarly inclined relative to radial planes of the rotor 24 passing through the slots 28. The opposite ends of the rotor include cruciform spiders 30 through the centers of which a central shaft 32 projects.

The opposite ends of the shaft 32 are journaled through the upper end portion of the support arm 18 and a corresponding portion of the support arm 20, the support arm 20 including an upwardly projecting extension 34 which projects above the upper periphery of the rotor 24 and has a rear wind vane 36 supported therefrom. The wind vane 36 projects away from the support arm 18 outwardly from the rear end of the windmill 10.

Corresponding edge portions of the side wall 26 defining corresponding longitudinal edges of the slots 28 include integral outwardly projecting vanes 40 and the vanes 40 generally parallel radii of the axis of rotation of the rotor 24 passing therethrough.

Adjacent slots 28 are spaced apart about the side wall 26 a distance substantially equal to the circumferential extent of the slots 28 and the width of the vanes 40 from their outer edge portions to their inner edge portions is substantially equal to the width of the slots 28. Accordingly, given a cylindrical body, such as the rotor 24 constructed of bendable material, the rotor 24 may be formed merely by forming U-shaped cuts in the side wall 26 and laterally outwardly displacing the portions of the side wall 26 enclosed within the U-shaped cuts. Of course, the support spiders may be added to the opposite ends of the rotor 24 in any convenient manner.

Figure 2:
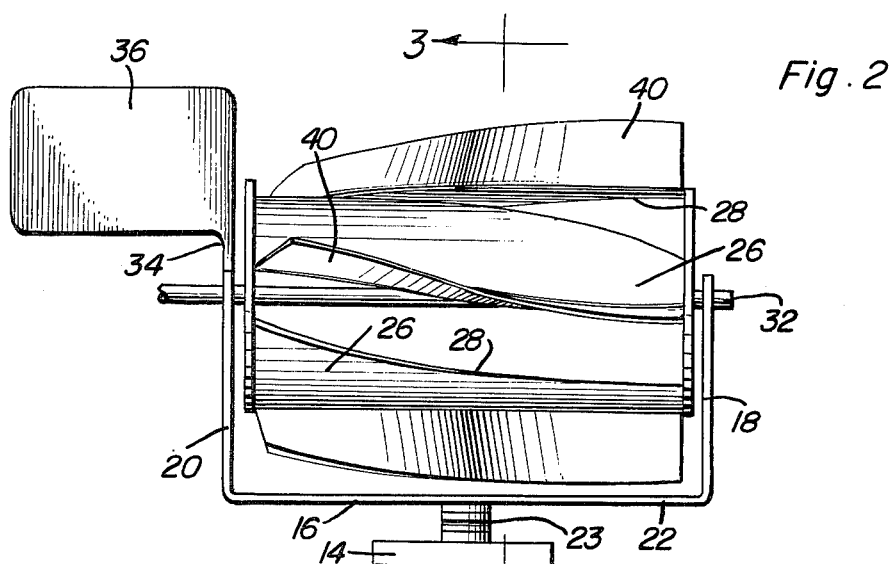
FIG. 2 is a side elevational view of the assemblage illustrated in FIG. 1 and on somewhat of an enlarged scale.

As disclosed, the generator 10 is designed to have the base 14 mounted on a stationary object subject to surface winds and the mount 16 together with the vane 36 will be capable of maintaining the forward end of the rotor 24 supported from the support arm 18 facing into the wind at all times. However, a mount similar to mount 16 may be utilized to journal the rotor 24 for rotation about a horizontal axis from a vehicle and with the horizontal axis extending in the direction of intended movement of the vehicle. Also, from FIG. 2 of the drawings, it may be seen that the slots 28 are inclined approximately 15° relative to radial planes of the rotor 24 extending through the slots 28 and it may be appreciated that the arms of the spiders 30 may be foil-shaped and inclined approximately 15° relative to radial planes of the rotor 24 extending along the arms of the spiders 30.

Figures 3, 4:
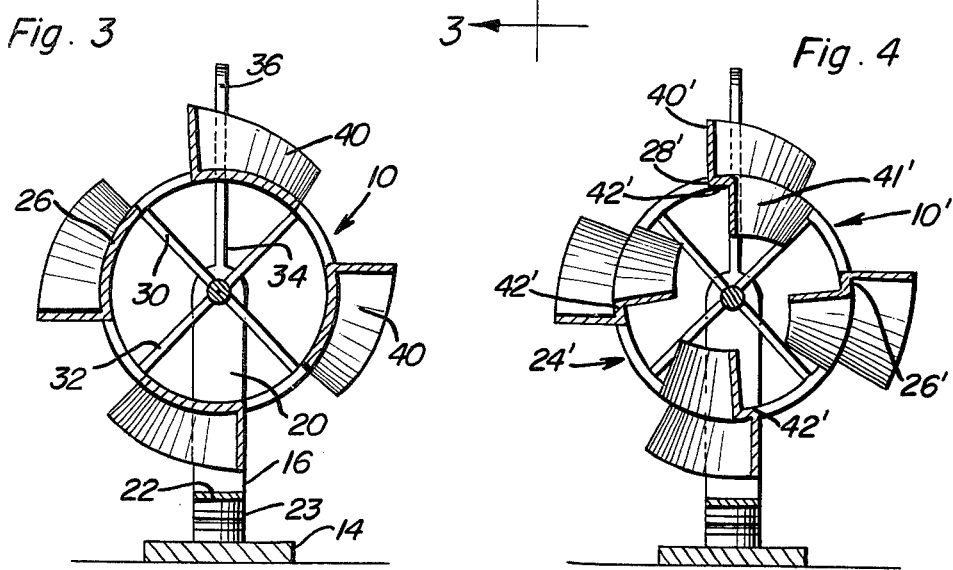
FIG. 3 is a transverse, vertical, sectional view taken substantially upon the plane indicate by the section line 3—3 of FIG. 2.
FIG. 4 is a transverse, vertical, sectional view similar to FIG. 3 but illustrating a modified form of windmill.

In addition, with attention invited more specifically to FIG. 4 of the drawings, there will be seen a modified form of windmill referred to in general by the reference numeral 10'. The windmill 10' is substantially identical to the windmill 10, except that the edges of the side wall 26' defining the edges of the slots 28' remote from the outer vanes 40' corresponding to the vanes 40 include integral inwardly projecting inner vanes 41' which are shaped and inclined in substantially the same manner as the vanes 40. Accordingly, only narrow bands 42' of the cylindrical side wall 26' remain between corresponding outer and inner vanes 40' and 41'. By using both the outwardly directed vanes 40' and the inwardly directed vanes 41' on the windmill 10', the radial extent of the annular path through which the vanes 40' and 41' swing is substantially doubled, thereby increasing the efficiency of the windmill 10' over the efficiency of the windmill 10. In addition, during high speed rotation of the rotor 24', wind passing into the interior of the rotor 24' may be more readily discharged therefrom through the wider angular spacing between adjacent pairs of vanes 40' and 41'. Still further, the offset between adjacent vanes 40' and 41' defined by the bands 42' serves to "catch" more of the wind incident upon the windmill 10' and the outer vanes 40' lead the corresponding inner vanes 41' in the direction of rotation of the rotor 24' as a result of wind incident thereupon from the front end of the rotor 24'.

The windmills 10 and 10' may be constructed of any desired size and may include as many vanes 40 and vanes 40', 41' as desired, or needed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A wind rotor comprising an elongated cylindrical body of a greater length than its diameter, having a cylindrical side wall and open at its opposite ends and journaled for rotation about an axis generally coinciding with the center axis of said body, said body including a plurality of circumferentially spaced longitudinally extending slots similarly slightly inclined relative to radial planes of said body passing through said slots, one set of corresponding edge portions of said cylindrical side wall defining corresponding longitudinal edges of said slots including integral outwardly projecting substantially rectangular outer vanes extending along said slots, said vanes comprising outwardly deflected integral portions of said cylindrical side wall, said vanes being disposed generally normal to lines tangent to said body at the base edges of said vanes integral with said body, the other set of corresponding edges of said cylindrical side wall defining the corresponding longitudinal edges of said slots including integral inwardly projecting substantially rectangular inner vanes extending along said slots, said inner vanes also being disposed generally normal to lines tangent to said body at the base edges of said inner vanes, the circumferential extent of each of said cylindrical side wall portions between corresponding outer and inner vanes comprising a narrow side wall band defining an offset between adjacent outer and inner vanes of considerably less circumferential extent than the radial extent of either of said corresponding vanes, each slot disposed between adjacent outer and inner vanes being of a width substantially equal to the combined radial extent of last mentioned vanes, said rotor including front and rear ends adapted to face into and opposite to the wind, a base from which said body is journaled, said base including support means for mounting said base for oscillation about an axis substantially normal to the first mentioned axis and disposed forwardly of the rear end of said rotor, said base including a wind vane generally paralleling said axes and disposed rearward of said support means, said outer vanes supported by said bands each leading the corresponding inner vane in the direction of rotation of said rotor as a result of wind incident thereon from the front end of said rotor.

2. The combination of claim 1 wherein said body includes opposite end spider assemblies including journal defining portions by which said body is journaled.

* * * * *